Figure 1:
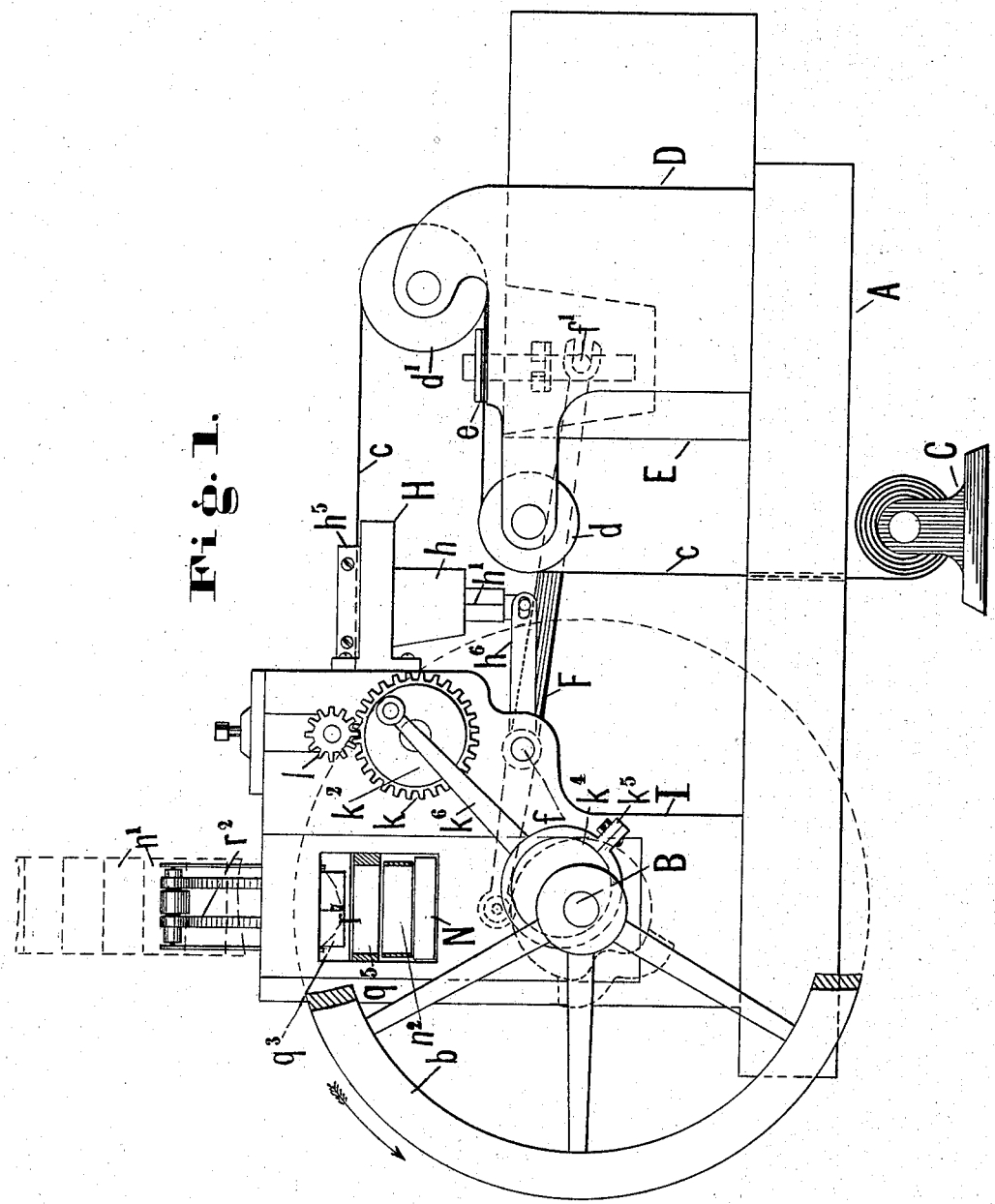

(No Model.) 10 Sheets—Sheet 1.

F. P. NEWTON & E. B. BEECHER.
MACHINE FOR MAKING MATCH BOXES.

No. 322,470. Patented July 21, 1885.

WITNESSES:
T. S. West.
Wm. T. Emerson.

INVENTORS:
F. P. NEWTON,
E. B. BEECHER,
BY H. W. Beadle & Co.
ATTYS.

(No Model.) 10 Sheets—Sheet 2.
F. P. NEWTON & E. B. BEECHER.
MACHINE FOR MAKING MATCH BOXES.
No. 322,470. Patented July 21, 1885.
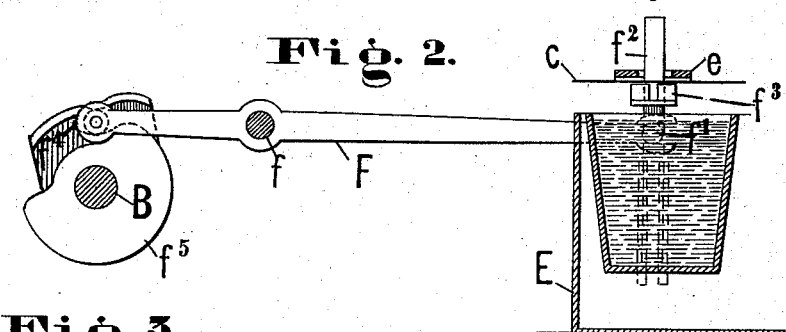
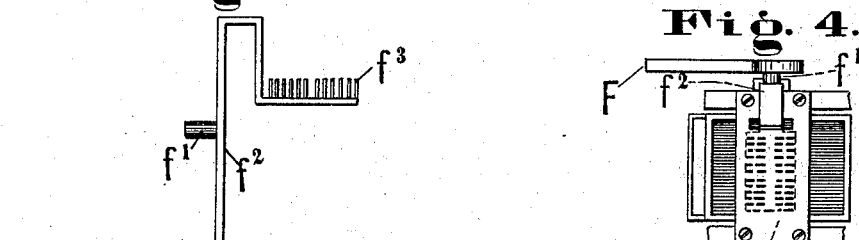
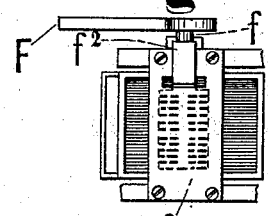
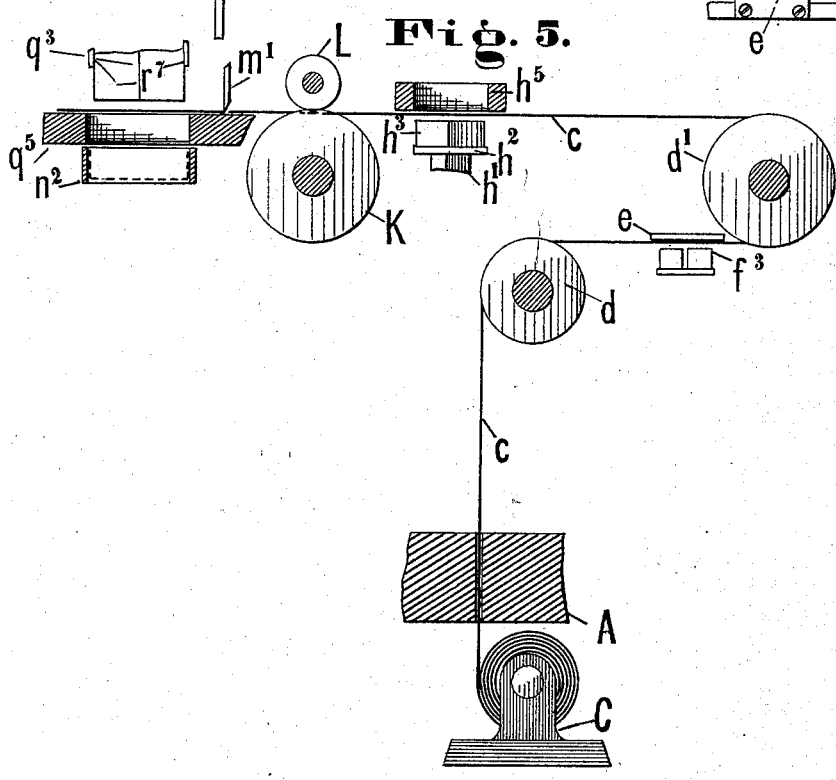
WITNESSES:
T. S. West,
Wm. T. Emerson.
INVENTORS:
F. P. NEWTON,
E. B. BEECHER,
BY H. W. Beadle &c.
ATTYS.

(No Model.) 10 Sheets—Sheet 3.

F. P. NEWTON & E. B. BEECHER.
MACHINE FOR MAKING MATCH BOXES.

No. 322,470. Patented July 21, 1885.

WITNESSES:
T. S. West
Wm T. Emerson

INVENTORS:
F. P. NEWTON,
E. B. BEECHER,
BY H. W. Beadle & Co
ATTYS.

(No Model.) 10 Sheets—Sheet 4.
F. P. NEWTON & E. B. BEECHER.
MACHINE FOR MAKING MATCH BOXES.
No. 322,470. Patented July 21, 1885.
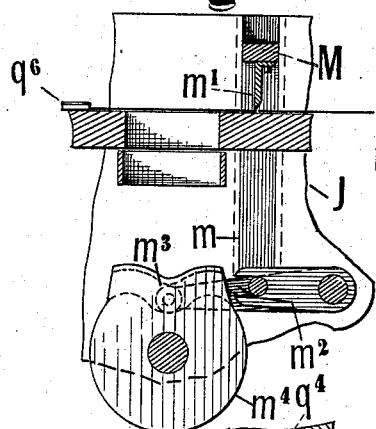
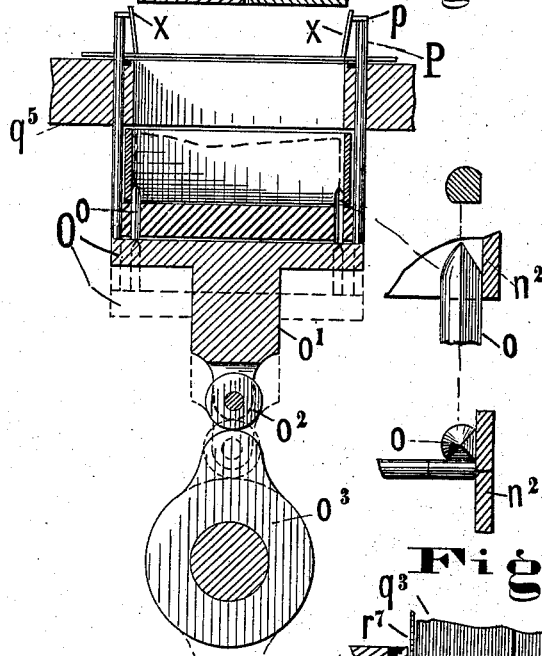
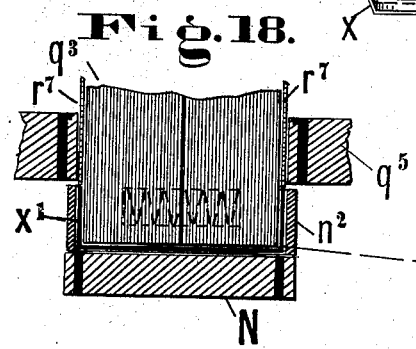
WITNESSES:
T. S. West
Wm. T. Emerson
INVENTORS:
F. P. NEWTON,
E. B. BEECHER,
BY H. W. Beadle + Co.
ATTYS.
N. PETERS, Photo-Lithographer, Washington, D. C.

(No Model.) 10 Sheets—Sheet 5.
F. P. NEWTON & E. B. BEECHER.
MACHINE FOR MAKING MATCH BOXES.
No. 322,470. Patented July 21, 1885.
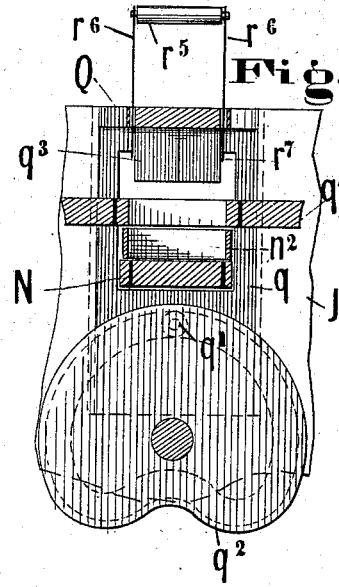
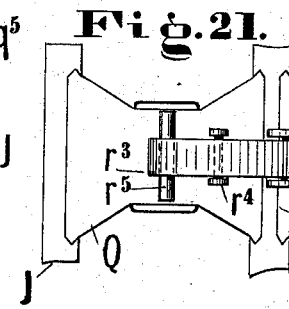
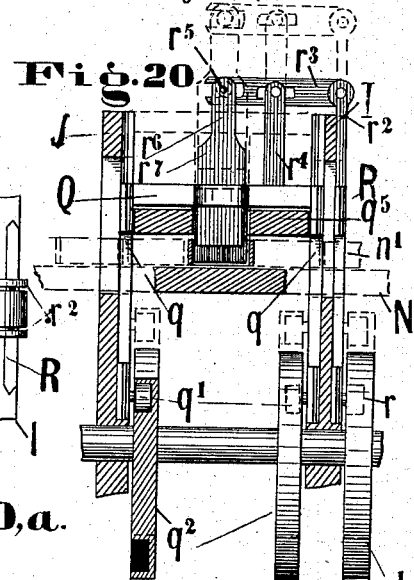
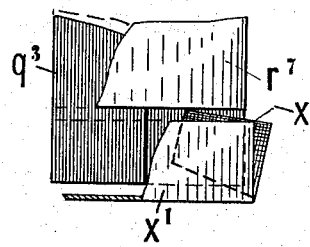
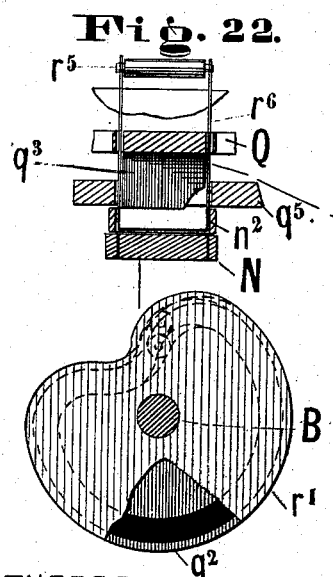
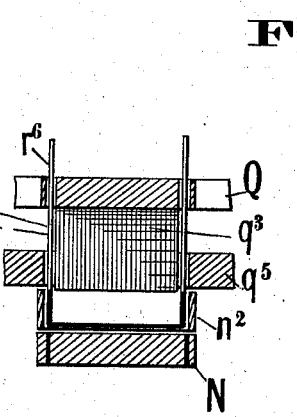
WITNESSES:
T. S. West
Wm. T. Emerson
INVENTORS:
F. P. NEWTON,
E. B. BEECHER,
BY H. W. Beadle & Co.
ATTYS.

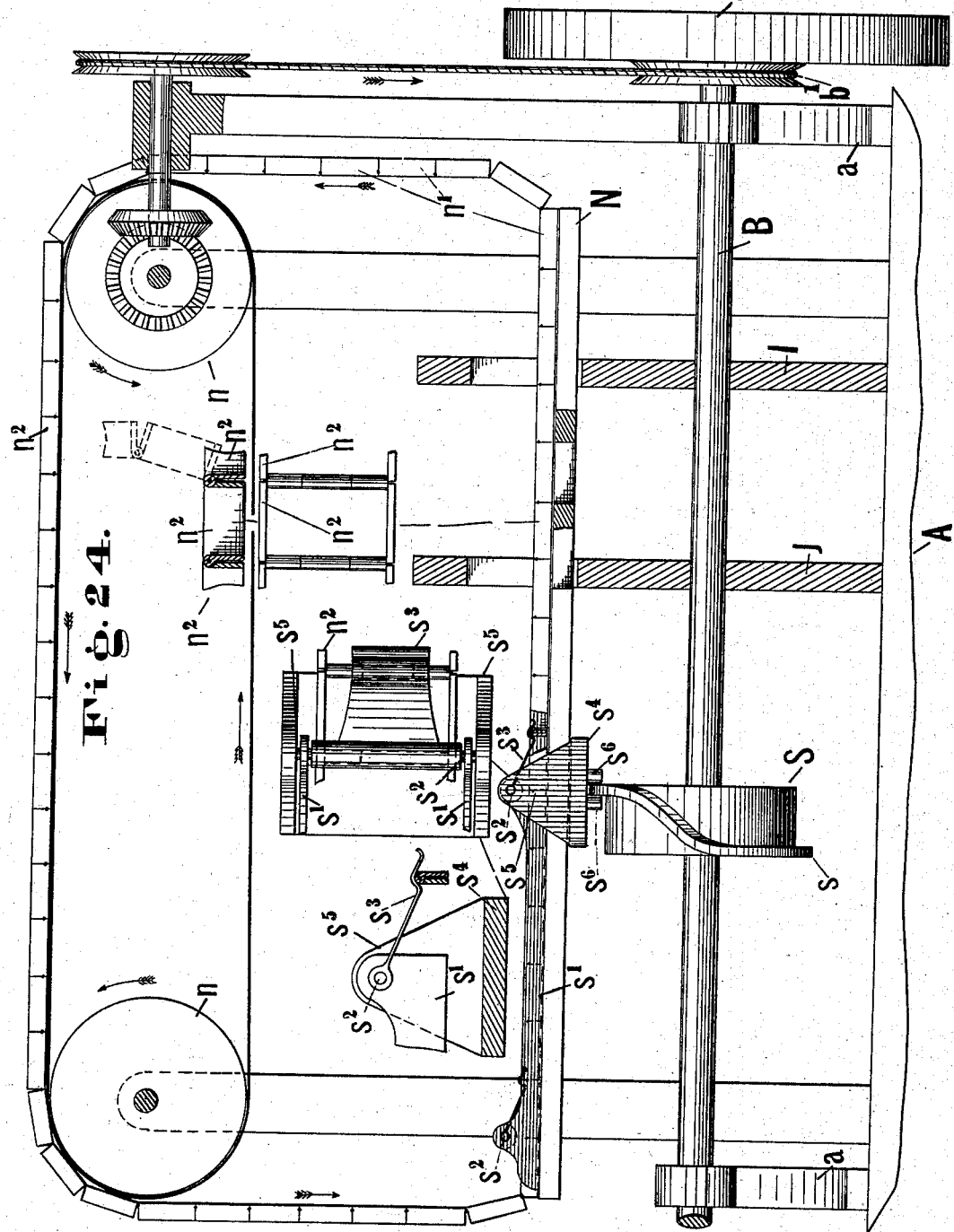

(No Model.) 10 Sheets—Sheet 7.

F. P. NEWTON & E. B. BEECHER.
MACHINE FOR MAKING MATCH BOXES.

No. 322,470. Patented July 21, 1885.

WITNESSES:
T. S. West
Wm. T. Emerson.

INVENTORS:
F. P. NEWTON,
E. B. BEECHER,
BY H. W. Beadle & Co.
ATTYS.

(No Model.) 10 Sheets—Sheet 8.
F. P. NEWTON & E. B. BEECHER.
MACHINE FOR MAKING MATCH BOXES.
No. 322,470. Patented July 21, 1885.
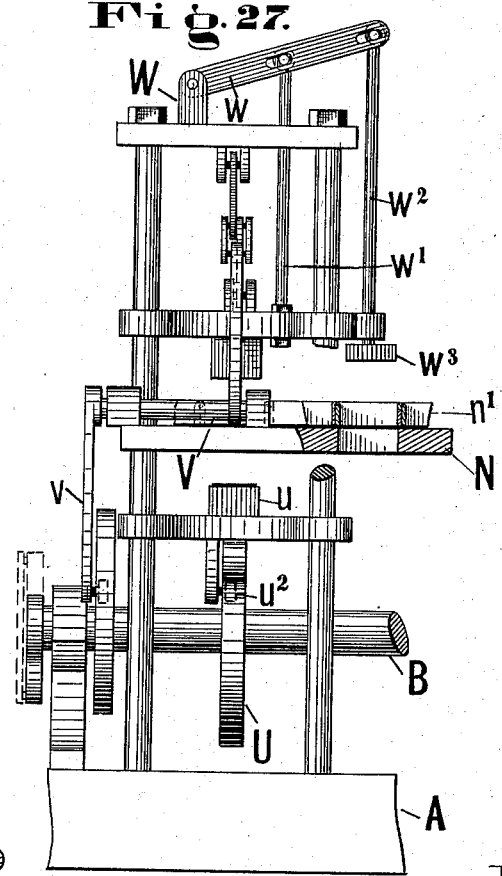
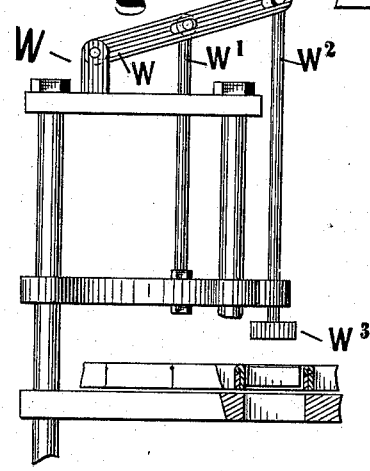
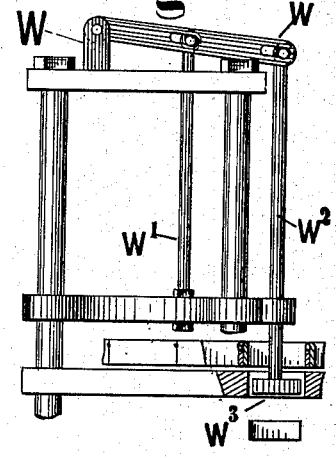
WITNESSES:
F. S. West.
Wm. T. Emerson.
INVENTORS:
F. P. NEWTON,
E. B. BEECHER,
BY H. W. Beadle & Co.
ATTYS.

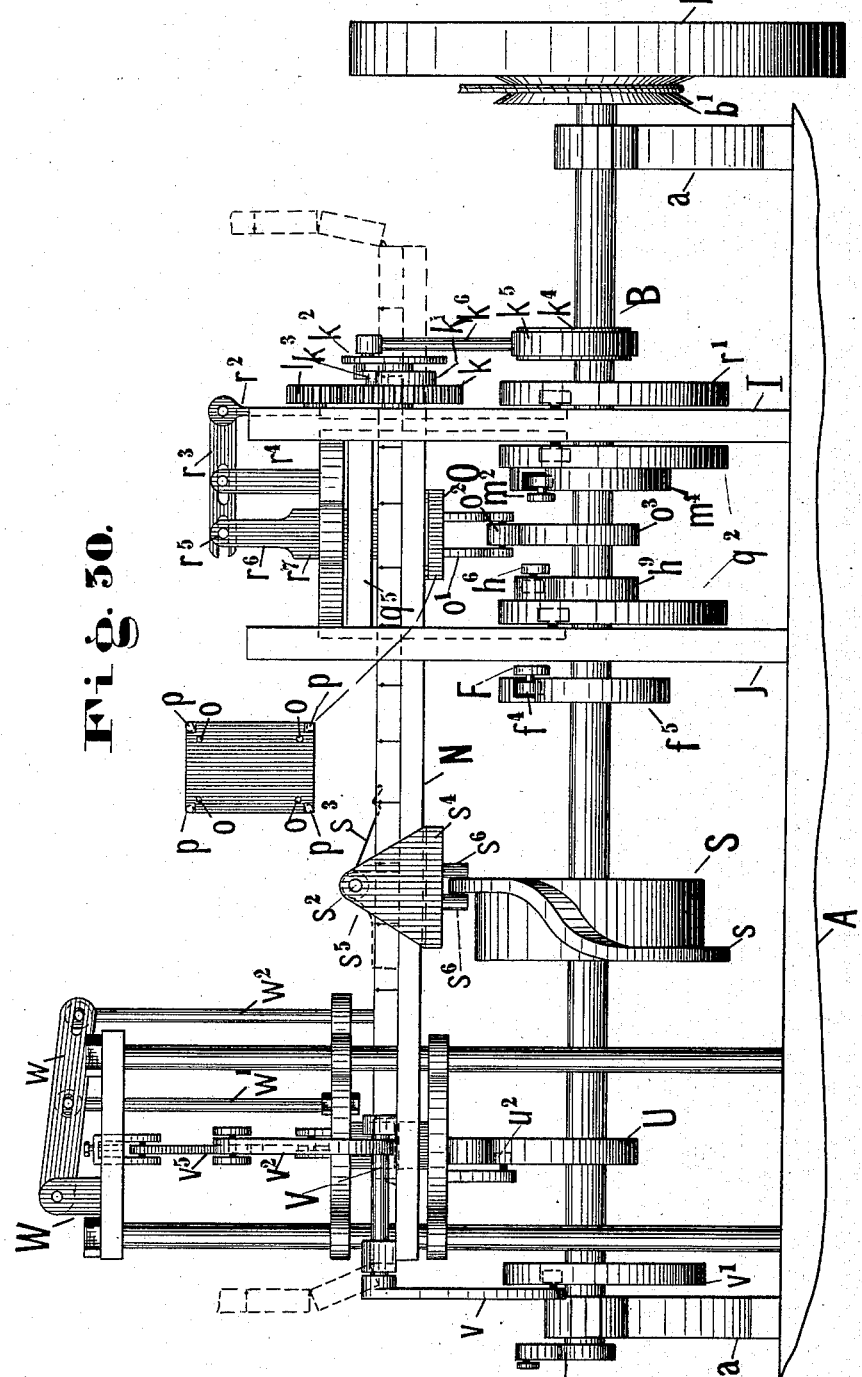

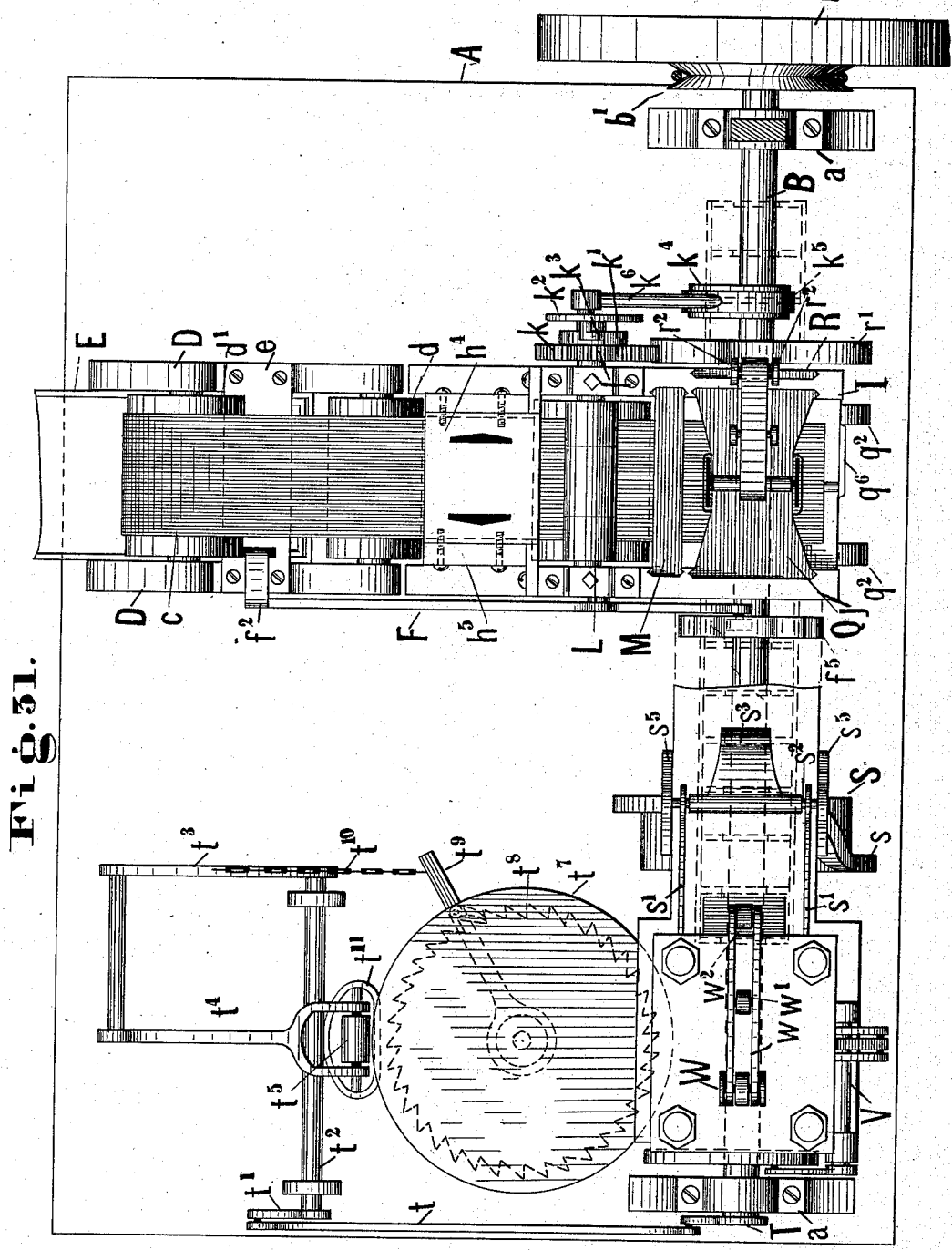

United States Patent Office.

FREDERICK P. NEWTON, OF WOODBRIDGE, AND EBENEZER B. BEECHER, OF WESTVILLE, CONNECTICUT.

MACHINE FOR MAKING MATCH-BOXES.

SPECIFICATION forming part of Letters Patent No. 322,470, dated July 21, 1885.

Application filed September 6, 1883. (No model.)

*To all whom it may concern:*

Be it known that we, FREDERICK P. NEWTON, of Woodbridge, county of New Haven, State of Connecticut, and EBENEZER B. BEECHER, of Westville, county of New Haven, and State of Connecticut, have invented new and useful Improvements in Machines for Making Match-Boxes; and we do hereby declare that the following is a full and exact description of the same, reference being had to the accompanying drawings, and to the letters of reference marked thereon.

This invention relates to that class of machines for manufacturing the ordinary quadrangular match-box, in which an endless chain having square links is employed to hold the boxes after the same have been formed, until the glue which unites the parts becomes perfectly hard; and it consists in certain combinations of parts, and in certain peculiarities of construction, fully described hereinafter, and specifically pointed out in the claims, by means of which a more perfect and efficient machine is produced.

Figure 6:
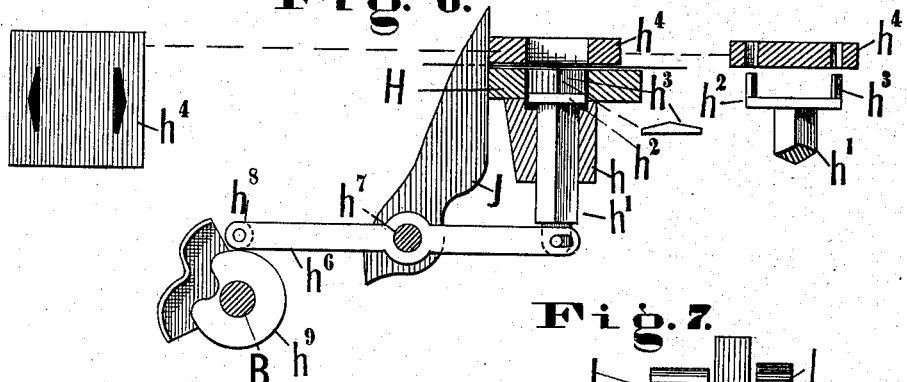
Figure 8:
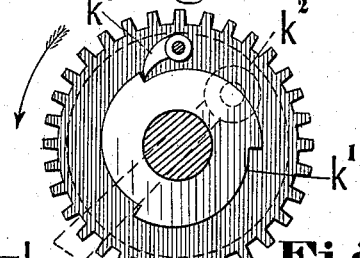
Figure 7:
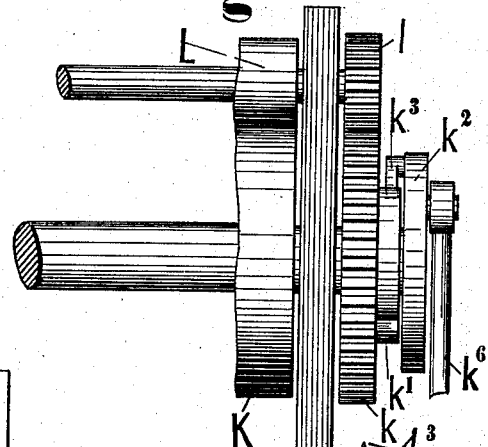
Figure 9:
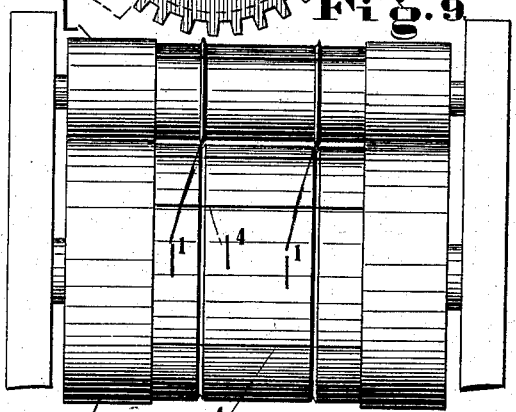
Figure 10:
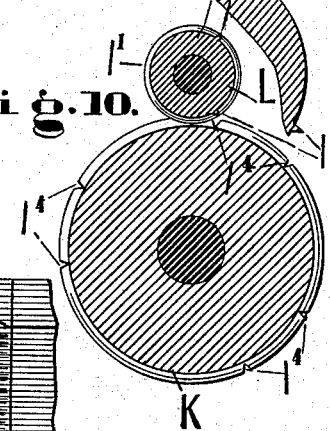
Figure 11:
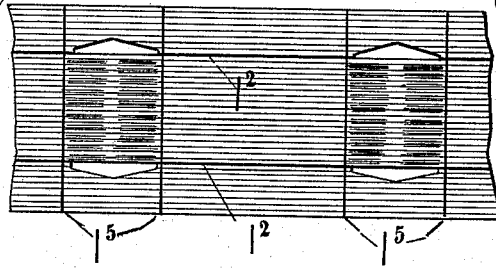
Figure 25:
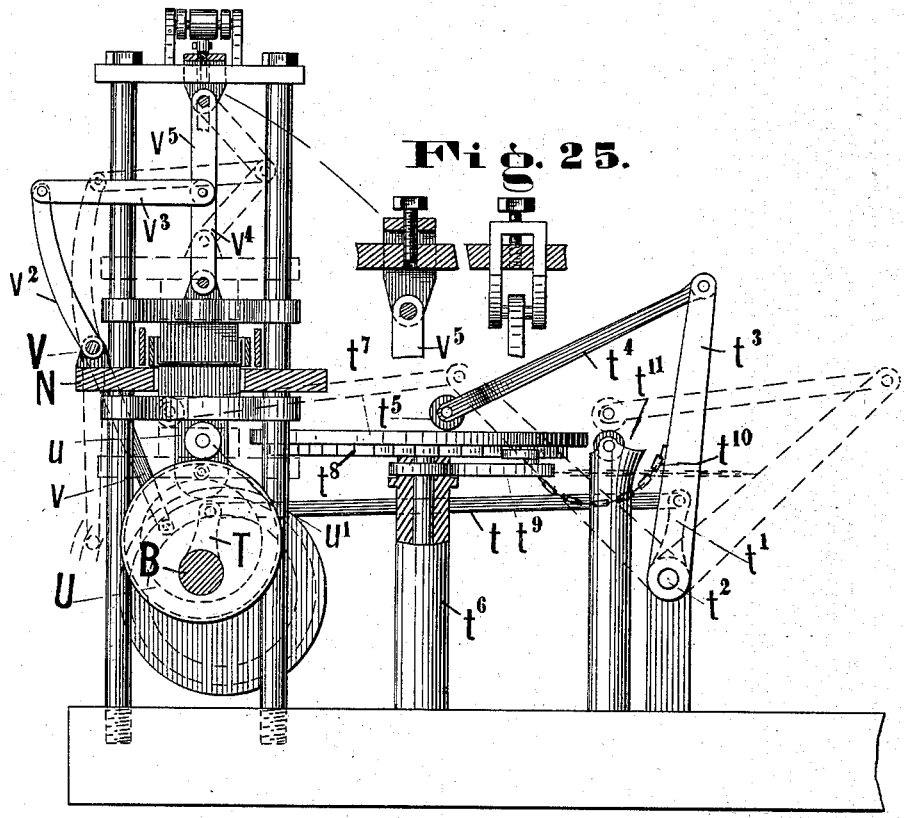
Figure 26:
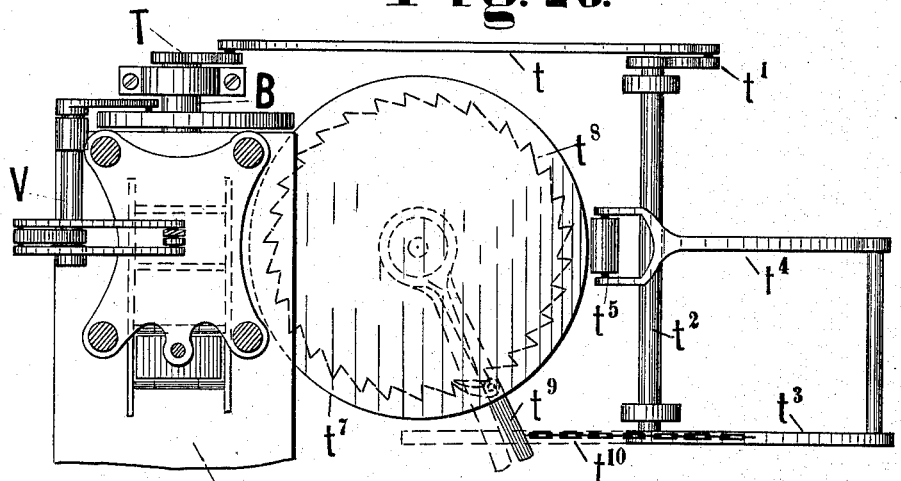

In the drawings, Figure 1 represents an elevation of the right end of our improved machine, taken from the right side of the same; Fig. 2, a detached view of the entire mechanism for applying the glue; Fig. 3, a detached view of the bar which carries the fingers for applying the glue; Fig. 4, a plan view of the glue-box, the finger-bar, and the plate $e$, which latter serves to hold the strip of paste-board while the glue is being applied thereto; Fig. 5, a side view illustrating the operation of the various mechanisms, by means of which the continuous strip of pasteboard is taken from the roll and formed into a box; Fig. 6, several detached views of the mechanism for removing the excess corner portions from the strip; Fig. 7, a front view of the mechanism for actuating the feed-rollers; Fig. 8, a detached view of the lower feed-roller, and the mechanism for giving the same an intermittent rotary movement; Fig. 9, a front view of the feed-rollers; Fig. 10, a sectional elevation of the same; Fig. 11, a plan view of a portion of the continuous strip after the glue has been applied to the same and the excess corner portions have been removed; Fig. 12, a side view, partially in section, of the mechanism for actuating the knife which severs the box-blank from the end of the strip; Fig. 13, a plan view of the same; Fig. 14, a front view of the same, partially in section; Fig. 15, a front view, partially in section, of the box-forming mechanism and the mechanism for centering and holding the link; Fig. 16, a plan view illustrating the action of the mechanism for turning up the corner-pieces of the box-blank; Fig. 17, a plan view illustrating the relative positions of the corner and end pieces of the box when the same is partially formed; Fig. 18, a view illustrating the position of the parts when the box has been completely formed in the link by the plunger; Fig. 19, a front view of the mechanism for actuating the plunger, and the mechanism for pressing the corner-pieces of the blank to place and for holding the box in the link when the plunger of the box-forming mechanism ascends; Fig. 20, a side elevation of the same; Fig. 20$^a$, a view illustrating the action of the blades $r'$ in turning down the corner-pieces $x$; Fig. 21, a plan view of the mechanism shown in Figs. 19 and 20; Fig. 22, a front view illustrating the action of the plunger and the plate, by means of which the box is held in the link when the plunger ascends; Fig. 23, a similar view taken from the right side; Fig. 24, several views of the endless chain and the mechanism for actuating the same; Fig. 25, an elevation, partially in section, of the left end of our machine, taken from the right side; Fig. 26, a plan view of the parts shown in Fig. 25; Fig. 27, a front elevation of the mechanism for printing the completed box, and the mechanism for discharging the same from the machine; Figs. 28 and 29, detached views illustrating the action of the mechanism for discharging the completed box from the machine; Fig. 30, a front view of the entire machine, with the exception of the overhead parts relating to the endless chain, and Fig. 31 a plan view of the same.

To enable others skilled in the art to make our improved machine and to properly use the same, we will proceed to describe fully the construction and manner of operation.

For convenience and clearness this description will be given under the following heads:

first, the base plate or table and the main shaft; second, the continuous strip of pasteboard, and the mechanism for guiding the same to the feed-rollers; third, the mechanism for applying the glue; fourth, the mechanism for removing the excess corner portions from the strip; fifth, the mechanism for feeding and scoring the pasteboard strip; sixth, the mechanism for severing the box-blank from the end of the strip; seventh, the endless chain, and the mechanism for guiding and supporting it in its movement; eighth, the mechanism for adjusting the square link of the chain in which the box is formed; ninth, the mechanism for turning up the corner pieces; tenth, the mechanism for pressing the blank into the square link to form the box; eleventh, the mechanism for pressing the corner pieces of the blank to place, and for holding the box in the link when the plunger of the box-forming mechanism ascends; twelfth, the mechanism for advancing the chain with an intermittent movement; thirteenth, the mechanism for inking the type; fourteenth, the mechanism for actuating the type-bed; fifteenth, the mechanism for actuating the blanket-pad; sixteenth, the mechanism for discharging the printed box from the machine; seventeenth, the operation of the machine as a whole.

First. The base plate or table and the main shaft.

A, Figs. 1, 30, and 31, represents the base plate or table of the machine supported upon any proper legs, and $a\ a$, Figs. 30 and 31, uprights or standards located near the ends of the same, which furnish proper bearings for the main shaft B, as shown. To this shaft the power is applied in any proper manner, and upon it are located the actuating-cams, hereinafter referred to, as shown in Fig. 30.

$b$, Figs. 1, 30, and 31, represents a fly-wheel attached to one end of the shaft, and $b'$, Figs. 30 and 31, a pulley adapted to receive a belt for giving movement to the endless chain, as will be hereinafter described.

Second. The continuous strip of pasteboard and the mechanism for guiding the same to the feed-rollers.

C, Figs. 1 and 5, represents a standard located at any point below the table of the machine, which is adapted in the manner well understood to hold a continuous strip of pasteboard of proper width wound into a roll, as shown.

$c$ represents the continuous strip of pasteboard extending from the roll upon standard C, up through a proper slot in the table, to and over proper guide-rollers, to and past the mechanism for applying the glue thereto, to and past the mechanism for cutting out the excess corner portions therefrom, to and past the feeding and scoring rollers, to the knife for separating the blank from the strip, and the box-forming mechanism, as is clearly indicated in Fig. 5.

D, Fig. 1, represents a standard rising from the table, which is adapted, in connection with a similar standard upon the opposite side of the machine, to support the guide-roller $d$, by means of which the position of the strip is changed from a vertical to a horizontal plane, and the guide-roller $d'$, by means of which the position of the strip is reversed, and the same is supported in a horizontal plane coincident with the opening between the feed-rollers.

Third. The mechanism for applying the glue.

E, Figs. 1 and 2, represents an exterior box for holding hot water, within which is located an interior box for holding glue in the manner well understood.

$e$, Figs. 1, 2, and 4, represents a spring-plate of steel, supported by the standards D D just above the continuous strip of pasteboard, as shown.

F, Figs. 1 and 2, represents a lever pivoted at the point $f$ upon the standard I, Fig. 1, which is connected at its rear end by means of a slot with the stud $f'$, Fig. 3, of the bent bar $f^2$, having the fingers $f^3$, as shown. This bar is secured to the side of the box E in such manner as to have free movement in a vertical direction.

$f^4$ represents a friction-roller upon the front end of the lever F, and $f^5$ a cam upon the main shaft next the standard J, Fig. 31, upon the outer side of the same, which is adapted to engage with the friction-roller upon the lever. The construction of the cam is such that at the proper time in the operation of the machine the lever F is actuated to cause the fingers $f^3$ upon the bar $f^2$ to dip down into the glue, and then rise out of the same and remain stationary for an instant, while the excess glue drips back into the box, and then bear up against the strip above. The strip itself during this action remains stationary, because of the inaction of the feed-rollers, and it is also held against the pressure of the finger-bars by the spring-plate $e$ above the same, as shown in Fig. 2.

Fourth. The mechanism for removing the excess corner portions from the strip.

H, Figs. 1 and 6, represents a bracket strongly secured to the rear edges of the standards I and J, and $h$ a hollow support depending therefrom adapted to hold the square shank $h'$ in such manner that it may move freely in a vertical direction.

$h^2$ represents a horizontal plate, having projecting-pieces $h^3\ h^3$ of special shape, as shown, which form the punches for cutting out the excess corner portions of the strip.

$h^4$, Figs. 6 and 31, represents a plate supported by the frame-plate $h^5$, which is provided with openings corresponding in form with the punches $h^3$ of the plate $h^2$, these openings being arranged in line over the punches in the manner well understood.

$h^6$ represents a lever pivoted at the point $h^7$ upon the standard J, the rear end of which is attached to the lower end of the shank $h'$, as shown.

$h^8$ represents a friction-roller upon the front end of the lever $h^6$; and $h^9$, Figs. 6 and 30, a cam upon the main shaft between the standards I J, adapted to engage with the friction-roller of the lever, in the manner well understood. The construction of the cam is such that at the proper time the punches are caused to ascend and cut out from the strip above the excess corner portions, these excess portions being conveyed away from the machine by any proper trough or spout.

Fifth. The mechanism for feeding and scoring the pasteboard strip.

I and J, Figs. 30 and 31, represent standards rising from the table A, which support the feeding and scoring rollers, and also the box-forming mechanism, as will be hereinafter described.

K, Figs. 7, 9, and 10, represents the lower feed-roller, which is provided at one end, outside of the supporting standard, with a gear-wheel, $k$, Figs. 1 and 7, adapted to engage with a corresponding gear-wheel, hereinafter referred to, upon the upper roller, and with a ratchet-disk, $k'$, Figs. 7 and 8, having three teeth, as shown in Fig. 8.

$k^2$, Fig. 8, represents a disk-plate journaled upon the shaft, which is provided with a pawl, $k^3$, as shown.

$k^4$, Figs. 1, 30, and 31, represents an eccentric upon the main shaft, and $k^5$ an eccentric ring, having the rod $k^6$, by means of which connection is made between the ring and the disk-plate, as shown.

By means of the described construction the eccentric is caused, when the main shaft revolves, to communicate a reciprocating movement to the disk-plate $k^2$, and this movement, by means of the pawl $k^3$, is converted into an intermittent rotary motion of the feed-roller K, the latter moving one-third of its revolution at each entire revolution of the main shaft. This lower feed-roller, K, is provided with proper grooves to permit the scoring-knives of the upper roller to have their proper action upon the pasteboard strip, as shown in Figs. 9 and 10.

L, Figs. 7, 9, and 10, represents the upper feed-roller, having the gear-wheel $l$, adapted to engage with the gear-wheel $k$, as shown. This roller is provided with two scoring-knives, $l'\ l'$, Figs. 9 and 10, arranged circumferentially about the same, one near each end, to form the longitudinal score-lines $l^2\ l^2$, Fig. 11, and two scoring-knives, $l^3\ l^3$, Fig. 10, corresponding with the grooves $l^4\ l^4$ of the roller K, Fig. 9, and which are arranged longitudinally the proper distance apart to form the transverse score-lines $l^5\ l^5$, Fig. 11, at the ends of the box-blank, as shown. This roller moves an entire revolution at each revolution of the main shaft.

By means of the described construction the pasteboard strip, by the action of the feed-rollers, is drawn from the roll on standard C up through the slot in the table and over the guide-rollers $d\ d'$, and then is passed through between the feed-rollers and scoring-knives to the box-forming mechanism, the strip in its passage being properly provided with glue, and properly cut to remove the excess corner portions, and also properly scored.

Sixth. The mechanism for severing the box-blank from the end of the strip.

M, Figs. 13 and 31, represents a plate having side pieces, $m\ m$, Figs. 12 and 14, adapted to slide vertically in proper ways in the standards I J, which plate is provided with the cutting-knife $m'$, as shown.

$m^2$ represents a lever pivoted at its rear end, as shown, and connected by a parallel arm to a stud projecting from one of the side pieces $m$ in such manner as to give vertical movement thereto when the lever is properly actuated.

$m^3$ represents a friction-roller upon the front end of the lever, and $m^4$ a cam upon the main shaft between the standards I J, which is adapted to engage with the roller of lever $m^2$ and give the latter proper movement. By means of this construction the lever is actuated at the proper time by the cam to cause the knife to sever the box-blank from the end of the continuous strip.

Seventh. The endless chain and the mechanism for guiding it and supporting it in its movement.

N, Figs. 24 and 30, represents a long bar or shelf, which extends through the standards I J of the box-forming mechanism at one end of the machine, and through the standards of the printing mechanism at the other, and is properly supported by them.

$n\ n$, Fig. 24, represent pulleys supported by proper hangers above the machine, one over each end, as shown.

$n'$ represents an endless chain consisting of rectangular links $n^2$, united together to form the chain by hinge-joints, as shown. The interior dimensions of each link coincide exactly with the exterior dimensions of the boxes which are made by the machine. The chain thus formed is caused to have an intermittent movement upon the shelf N by mechanism hereinafter described, for the purpose of presenting successively each link to the box-forming mechanism to receive a box-blank. When the box has been forced into the link, the latter passes out of the range of action of the box-forming mechanism up over the guide-rollers and down again to the other end of the machine, where it is first subjected to the action of the printing mechanism and then discharged from the machine. By the employment of this endless chain the box, after being forced into the link, is positively held with its parts in their proper relative positions until the glue which is employed to unite the parts becomes hard.

Eighth. The mechanism for adjusting and holding the rectangular link in which the box is formed.

O, Fig. 15, represents a horizontal plate supported between the standards I J in such manner as to be capable of free movement in a vertical direction, which plate is provided with four studs, $o$ $o$ $o$ $o$, as shown in Fig. 30 in detached view. The upper end of each stud, Fig. 15, is provided with inclines upon two sides, terminating below in vertical planes lying at right angles to each other. The studs are so located on the plate, it will be observed in Fig. 15, as to engage, when the plate is raised at the proper time, with the inner corners of the link, which has been moved upon the shelf into position beneath the plunger of the box-forming machine.

$o'$ represents a shank or standard supporting the plate O, and $o^2$ a friction-roller attached thereto.

$o^3$ represents a box-cam upon the main shaft between the standards I J, which is adapted to engage with the friction-roller $o^2$, as shown.

The mechanism for moving the chain places the link nearly in the proper position to receive the box-blank from the box-forming mechanism. The studs $o$ $o$ then adjust the link exactly in its proper position and hold the same until the proper movement has been made by the plunger of the box-forming mechanism. The adjustment of the link is effected by the inclined sides of the studs, which, by contact with the inner corners of the link, move the same to place when it is out of position. The holding of the link is effected by the right-angled sides of the studs, which accurately fit the corners, as shown.

By means of the described construction the cam is caused at the proper time to elevate the plate O and first adjust accurately the rectangular link, which is about to receive a box-blank, and then hold the same in position until the proper movement has been made by the plunger of the box-forming mechanism—that is, until the plunger has entered the link. By the further revolution of the cam also the plate is drawn down again at the proper time to prevent interference with the plunger.

Ninth. The mechanism for turning up the corner-pieces of the box-blank.

P, Figs. 15, 16, and 30, represents one of four studs rising from the plate O, each of which is provided with a horizontal plate, $p$, Figs. 15 and 16, which lies flush with the surface of the bed-plate of the box-forming mechanism when the plate O is in its downward position. These plates occupy such relation to the box-blank that the corner-pieces $x$ of the latter, when the same is in position upon the bed of the box-forming mechanism, lie directly over them, as indicated in dotted lines, Fig. 16, and hence when the plate O is raised the corner-pieces of the blank are also raised, as indicated in full lines, Figs. 15 and 16.

Tenth. The mechanism for pressing the box-blank into the rectangular link to form the box.

Q, Figs. 21 and 31, represents a head having side plates, $q$, Figs. 19 and 20, adapted to slide vertically in proper ways in the standards I J.

$q'$ represents a friction-roller upon each of the side plates, and $q^2$ box-cams located next to the standards I J, upon the inner side of the same, by means of which the side plates are given their proper vertical movement.

$q^3$ represents a plunger depending from the head, which is divided vertically, as shown.

$q^4$, Fig. 15, represents a spring having a bearing at each end, as shown, which spring tends to separate the two parts of the plunger within certain limits.

$q^5$, Figs. 2, 15, 18, 19, and 20, represents a bed-plate properly secured between the standards I J, which is provided with a proper opening, through which the box-blank is forced into the link below, and also with proper openings for the studs P.

$q^6$, Fig. 31, represents a stop-plate upon the bed-plate, which serves to hold the blank from accidental movement when severed by the knife.

By means of this described construction the plunger is caused to descend at the proper time and force the box-blank through the opening in the bed-plate into the link below, as indicated in Fig. 18.

Eleventh. The mechanism for pressing the corner-pieces of the blank to place and for holding the box in the link when the plunger of the box-forming mechanism ascends.

R, Figs. 21, 23, and 31, represents a plate adapted to slide in proper ways in the standard I; and $r$, Figs. 20 and 23, a friction-roller secured thereto near its lower end, as shown.

$r'$, Figs. 20, 23, 30, and 31, represents a cam upon the main shaft next the standard I upon the outer side of the same, which is adapted to engage with the roller to give the plate R proper movement.

$r^2$ $r^2$, Figs. 21 and 31, represent standards upon the upper end of the plate; and $r^3$, Figs. 20, 21, and 23, a lever attached thereto.

$r^4$ represents a standard rising from the head Q, which forms a fulcrum-bearing for the lever $r^3$.

$r^5$ represents a cross-bar resting in a slot in the end of the lever, to which is attached at each end a plate or bar, $r^6$, having a blade, $r^7$, at its lower end. These plates or blades lie adjacent to the ends of the plunger, with an intervening space between their lower edges and the lower edge of the plunger when the parts are in their normal positions, as shown in Fig. 19. This intervening space is filled by the corner-pieces $x$ and the end portion, $x'$, of the box when the plates and plunger have completed their downward movement, as shown in Fig. 18.

The operation is substantially as follows: The fulcrum-bearing $r^4$ being supported by the head Q, it follows that when the latter is caused to descend by the action of its cams, for the purpose of depressing the plunger to form the box, the bearing $r^4$, the lever $r^3$, the blades $r^7 r^7$, and the arm R will also descend with it, the arm R, however, being lowered with the other parts by the coincident action of its cam $r'$. By means of this action the blades $r^7$, Fig. 20$^a$, are caused to bear upon the corner-pieces $x$, which have been turned in by the plate $p$, and press them down even with the upper surface of the end piece, as shown. When the plunger, after forcing the box-blank completely into the link, is caused to ascend by the action of its cams, the blades $r^7$ are held stationary by the action of the cam $r'$, as shown in Fig. 22, for the purpose of preventing the box from rising out of the link with the plunger. After the plunger has been completely withdrawn, the plates $r^7$, by the action of the cam $r'$, are raised to their normal position.

Twelfth. The mechanism for advancing the chain with an intermittent movement.

S, Figs. 24, 30, and 31, represents a disk upon the main shaft near the center of the same, which is provided upon its periphery with a cam-flange, $s$, as shown.

$s'$ $s'$ represent bars resting on an extended portion of the long bar or shelf N, which bars $s'$ $s'$ are united together at each end to form a frame by means of transverse shafts $s^2$ $s^2$.

$s^3$ $s^3$ represent pawls pivoted upon the shafts $s^2$ $s^2$, which are adapted at their free ends to engage with the hinge-bar of the link, as shown.

$s^4$ represents a U-shaped plate or block, the arms $s^5$ of which are secured to the frame $s'$, as shown.

$s^6$ $s^6$ represent studs upon the lower face of the block $s^4$, between which moves the cam-flange $s$ of the disk S.

The operation is substantially as follows: By the revolution of the main shaft the cam-disk S is caused to give the block $s^4$ and the frame $s'$, attached thereto, a reciprocating movement. By means of the reciprocating movement the pawls $s^3$ $s^3$ are caused to feed forward the chain with an intermittent movement in the manner well understood. If desired, also, the pulleys above may be united by an endless belt, as shown in Fig. 24, and be driven by any proper gearing actuated by a belt upon the fly-wheel pulley $b'$. In this case sufficient slack is given to the chain to permit its necessary movement without interference with the continuous movement of the pulley. By means of this construction the chain is prevented from hanging or dragging after leaving the last actuating-pawl.

Thirteenth. The mechanism for inking the type.

T, Figs. 25, 26, 30, and 31, represents a crank upon the extreme end of the main shaft; and $t$, a connecting-rod uniting the crank to the upper end of the arm $t'$, Fig. 25, of the rock-shaft $t^2$, which shaft is held in proper bearings upon the table, as shown.

$t^3$ represents an arm on the opposite end of the rock-shaft, to which is attached, by means of a wrist-pin, the end of the arm $t^4$ of the yoke, which holds the roller $t^5$, as shown.

$t^6$ represents a standard adapted to support a circular inking-table, $t^7$, in such manner as to permit it freely to revolve.

$t^8$ $t^8$ represent ratchet-teeth upon the table, and $t^9$ a lever pivoted at the center of the table, which is provided with a pawl adapted to engage with the ratchet-teeth and give the table movement in the manner well understood. The free end of this lever is arranged in such relation to the arm $t^3$ of the rock-shaft $t^2$ as to be struck by the same in its forward movement, for the purpose of receiving the proper movement to actuate the table.

$t^{10}$ represents a chain, by means of which the proper return movement of the lever is caused by the return movement of the arm $t^3$. An auxiliary pawl upon any proper support holds the same against return movement when the lever returns.

$t^{11}$ represents an ink-well provided with a roller, in the manner well understood.

The operation is substantially as follows: By the revolution of the main shaft the crank and its connections at the proper time are caused to actuate the rock-shaft $t^2$ to throw forward the ink-roller over the inking-table and the type-bed, in the manner well understood.

Fourteenth. The mechanism for actuating the type-bed.

U, Figs. 25 and 27, represents a cam upon the main shaft; and $u$, a head adapted to have a vertical movement between any proper standards, which is provided with a roller, $u'$, resting upon the face of the cam, and a roller, $u^2$, Fig. 30, resting in a groove upon the side of the cam. Upon the upper face of the head is located the recess for the electrotype-plate.

The operation is as follows: At the proper time in the operation of the machine the type-bed is elevated by the action of its cam to print the box, the latter being properly held in the link at this time by the action of the blanket-pad hereinafter referred to.

Fifteenth. The mechanism for depressing the blanket-pad.

V, Figs. 25, 26, and 30, represents a rock-shaft supported by proper bearings upon the shelf N, which is provided at one end with a downwardly-extending arm, $v$, having a friction-roller adapted to engage with a surface-cam, $v'$, upon the main shaft.

$v^2$ represents an upwardly-extending arm upon the rock-shaft, which is united by means of a connecting-rod, $v^3$, to the pivot center of the toggle-levers $v^4$ $v^5$, the upper one of which is adjustably secured to the top plate of the frame-work, as shown in Fig. 25, and the lower one of which is provided with a head having a blanket-pad, as shown.

The operation of these parts is substantially as follows: By the revolution of the main shaft the rock-shaft V, by means of the arm $v$ engaging with the cam $v'$, is caused to actuate through the arms $v^2$ $v^3$ the toggle-levers $v^4$ $v^5$, and thus depress the blanket-pad into the box for the purpose of holding the same properly while it is being printed by the mechanism before described. The bottom of the box at this time, it will be understood, is exposed to the action of the type-bed through an opening in the shelf, the latter rising to print the box at the same time that the blanket-pad descends to hold it, as shown in Fig. 25.

Sixteenth. The mechanism for discharging the completed box.

W, Figs. 27, 28, and 29, represents a standard resting upon the upper plate of the framework at the left end of the machine, and $w$ a lever pivoted thereto, as shown.

$w'$ represents a connecting-rod uniting the movable head which carries the blanket-pad to the lever $w$ near the center of the latter, as shown.

$w^2$ represents a rod depending from the free end of the lever $w$, which is provided below with a plate, $w^3$, adapted to enter the box and strike the bottom of the same.

The operation of these parts is substantially as follows: By the descent of the head which carries the blanket-pad the plate $w^3$, by means of the lever and connecting-rods before described, is caused to descend also, and, by contact with the bottom of the box, to push the same out of its link through an opening in the shelf, as shown in Figs. 28 and 29. By means of the lever $w$ a sufficient range of movement is obtained to effect the complete discharge of the box.

Seventeenth. The operation of the machine as a whole.

The machine having been properly supplied with material, and movement having been communicated to the main shaft, the following operations will result: The continuous strip of pasteboard $c$ will be drawn from the roll upon standard C, Figs. 1 and 5, over the guide-rollers $d$ $d'$ with an intermittent movement by the feed-rollers K L, Figs. 9 and 10, this intermittent movement resulting from the eccentric mechanism $k'$ $k^2$ $k^3$ $k^4$ $k^5$, Figs. 1, 7, and 8. The strip, also, by the action of the feed-rollers is delivered through them to the box-forming mechanism Q $q$ $q'$ $q^2$ $q^3$, Figs. 15 and 19, and to the mechanism M $m$ $m'$ $m^2$ $m^3$ $m^4$, Figs. 12, 13, and 14, for severing the blank from the end of the strip. The strip, also, by the action of the feed-roller is scored in its passage through between them upon the longitudinal lines $l^2$ $l^3$, Fig. 11, and the transverse lines $l^5$ $l^5$. At each rest in the movement of the strip the glue is applied to the proper points, as indicated in Fig. 11, this portion constituting the end piece, $x'$, when the blank is formed, as shown in Fig. 16. At each rest in the movement of the strip, also, the excess corner portions are removed from a portion of the strip to which the glue has been applied, the mechanism for accomplishing this, $h$ $h'$ $h^2$ $h^3$ $h^4$ $h^5$ $h^6$ $h^7$ $h^8$ $h^9$, being shown in Figs. 1 and 6. At each rest in the movement, also, a blank previously prepared by the application of the glue, the cutting out of the corner portions, and the formation of the scoring-lines, is severed from the end of the strip and formed into a box by the mechanism before referred to, as indicated in Fig. 5. At each rest in the movement of the strip, also, the endless chain $n'$, Fig. 24, remains stationary for the purpose of receiving a box-blank from the box-forming mechanism into one of its links, the latter being first accurately adjusted and then held in proper position by the mechanism O $o$ $o'$ $o^2$ $o^3$, Figs. 15 and 30. At the beginning of the downward movement of the plunger $q^3$, Fig. 15, to depress the box-blank into the link, the corner-pieces $x$ of the blank, Figs. 15 and 16, are turned up by the plates $p$, and caused to assume, by the joint action of these plates and plunger, the position shown in Fig. 17, and then by the further action of the plunger and the blades $r^7$, hereinafter referred to, the position shown in Fig. 18, the box in this view being represented as fully formed. After the plunger has entered the link, but before its complete descent, the mechanism O for adjusting and holding the link, is withdrawn to prevent an interference of these parts. When the plunger $q^3$, Fig. 20$^n$, descends to form the box, the blades $r^7$ of the mechanism R $r$ $r'$ $r^2$ $r^3$ $r^4$ $r^5$ $r^6$, Figs. 20, 22, and 23, descend with it, and press the corner-pieces $x$ down even with the upper edge of the end pieces, $x'$, as shown in Figs. 22 and 23. When the plunger ascends, however, the plates $r^7$, by the action of their cam $r'$, remain stationary, and bear upon the upper edges of the end portions of the box, for the purpose of holding the same properly in the link while the closely-fitting plunger is being withdrawn. After the withdrawal of the plunger the blades $r^7$ are raised again to their normal position. After the ascent of the blades $r^7$ the endless chain is advanced one step, to remove the filled link from the range of action of the box-forming mechanism, and to bring an empty link within its range. The movement of the endless chain is effected by the pawl mechanism S $s$ $s'$ $s^2$ $s^3$ $s^4$ $s^5$ $s^6$, Fig. 24, and the endless belt and gearing overhead. By means of this endless chain the boxes, as they are successively formed in the links, are carried up from one end of the machine over the pulleys $n$ $n$, down to the other end of the machine before they are discharged therefrom. During all this period of travel each box is positively held by its link with its parts in their proper relation to each other, and consequently the glue which is employed to unite them has ample time to become perfectly hard. From this it follows that no trouble can arise from the ungluing of the parts. As the boxes in the chain re-enter the machine at the end opposite to that where they were formed, each one in its turn is first printed upon its lower side and then discharged from the machine. Before printing each box the electrotype-plate upon the head $u$ of the type-bed mechanism, Figs. 25, 27, and 30, is supplied with ink when in its downward position by the inking mechanism T $t\ t'\ t^2\ t^3\ t^4\ t^5\ t^6\ t^7\ t^8\ t^9\ t^{10}\ t^{11}$, Figs. 25 and 26, as indicated in dotted lines, Fig. 25. The printing is effected by the upward movement of the head $u$ after the inking-roller $t^5$ has been withdrawn, the head bearing up through an opening in the shelf N against the lower side of the box. The box at this time is properly held by the blanket-pad, which has been pressed into it by the action of the mechanism V $v\ v'\ v^2\ v^3\ v^4\ v^5$, Fig. 25. The box, after having been printed, is discharged at the next step in the movement of the machine by the push-out mechanism W $w\ w'\ w^2\ w^3$, Figs. 27, 28, 29, and 30.

If desired, proper mechanism for applying sand to the box may be substituted for the printing mechanism.

A certain relation exists between the parts, as follows: The eccentric mechanism $k'\ k^2\ k^3\ k^4$, by means of which the feed-rolls are caused to communicate an intermittent movement to the continuous strip of pasteboard, and the cam mechanism S $s^6$, by means of which the pawls $s^3$ are caused to communicate an intermittent movement to the endless chain, act in harmony with each other, so that while the strip remains stationary to permit the application of the glue the cutting out of the excess corner portions, the severing of the blank from the end of the strip, and the formation of the box, the endless chain remains stationary to receive at one end of the machine the box-blank for the box-forming mechanism, and to permit at the other end the printing of a box and the discharge of the box previously printed from the machine. While these parts have their movement the other parts which act during their interval of rest of course remain stationary. The blades $r^7$ act in harmony with the plunger $q^3$ to form the box—that is, they descend with the plunger to press down the corner-pieces to their proper place, while the plunger presses down the body portion with its sides and ends, but they act in opposition to the plunger when the box is formed by remaining stationary, while the plunger rises. The mechanism O $o$ for adjusting the link to receive the box-blank and the corner-turners P $p$ ascend to perform their work before the complete descent of the plunger, and then descend in time to avoid interference with it.

The box-forming mechanism and the endless chain, it will be observed, are arranged in such relation to each other that the line of movement of the strip of pasteboard is at right angles to the line of movement of the chain. By means of this arrangement the parts are brought compactly together, and the possibility of any disarrangement of the blanks before reaching the links is avoided. The auxiliary parts of the printing mechanism are also arranged outside of the line of movement of the chain, and the printing action occurs only when the drying of the glue has been completed.

By the employment of mechanism for depressing the box-blanks into the links in connection with mechanism for pressing down the corner-pieces of the blank accurately-formed boxes are invariably produced.

By the employment of the mechanism for adjusting the link in connection with the box-forming mechanism perfect accuracy of manufacture is insured.

By the employment of the divided plunger with separating-spring it is possible to use different thicknesses of pasteboard without danger of breaking the links.

By means of the adjusting mechanism attached to the upper toggle-lever, $v^5$, the pressure of the blanket-pad may be adjusted at will.

Having thus fully described our invention, what we claim as new, and desire to secure by Letters Patent, is—

1. In combination with mechanism, substantially as described, for depressing the box-blank into the link, mechanism, substantially as described, for pressing down the corner-pieces of the blank and holding the box as the plunger ascends.

2. The combination of the following elements: mechanism, substantially as described, for gluing the pasteboard strip; mechanism, substantially as described, for cutting out the excess corner portions; mechanism, substantially as described, for feeding and scoring the box-blank; mechanism, substantially as described, for depressing the box-blank into the link; and mechanism, substantially as described, for pressing down the corner-pieces of the blank and holding the box as the plunger ascends.

3. In combination with the fixed bed-plate $q^5$, having a proper opening, and the plunger $q^3$, mechanism, substantially as described, for turning the corner-pieces $x$ into position before the end pieces, $x'$, are folded to place.

4. The gluing mechanism described, consisting of the cam $f^5$, lever F, with slotted end, the bar $f^2$, with stud $f'$, and the finger $f^3$, as described.

5. The combination of the plunger $q^3$ and its actuating mechanism, with the blades $r^7$ and their actuating mechanism.

6. In combination with the plunger $q^3$, the corner-turners P $q$, and the mechanism O $o\ o'\ o^2\ o^3$ for adjusting and holding the link.

7. In combination with the endless chain $n'$, the disk S with cam-flange $s$, bars $s'$, shafts $s^2$, pawls $s^3$, blocks $s^4$, arms $s^5$, and studs $s^6$.

8. The combination of the following elements: mechanism, substantially as described, for giving vertical movement to a type-bed; mechanism, substantially as described, for giving vertical movement to a blanket-pad; and an endless chain adapted to hold the box in position to be acted upon by the pad and type-bed.

9. The combination of the following elements: an endless chain and mechanism for giving it an intermittent movement; box-forming mechanism, substantially as described, and printing mechanism, substantially as described, the printing mechanism being located in relation to the chain at the farthest possible point from the box-forming mechanism.

This specification signed and witnessed this 3d day of September, 1883.

FREDERICK P. NEWTON.
EBENEZER B. BEECHER.

Witnesses:
GEO. L. FINNEY,
M. L. THOMAS.